United States Patent Office 3,302,772
Patented Feb. 7, 1967

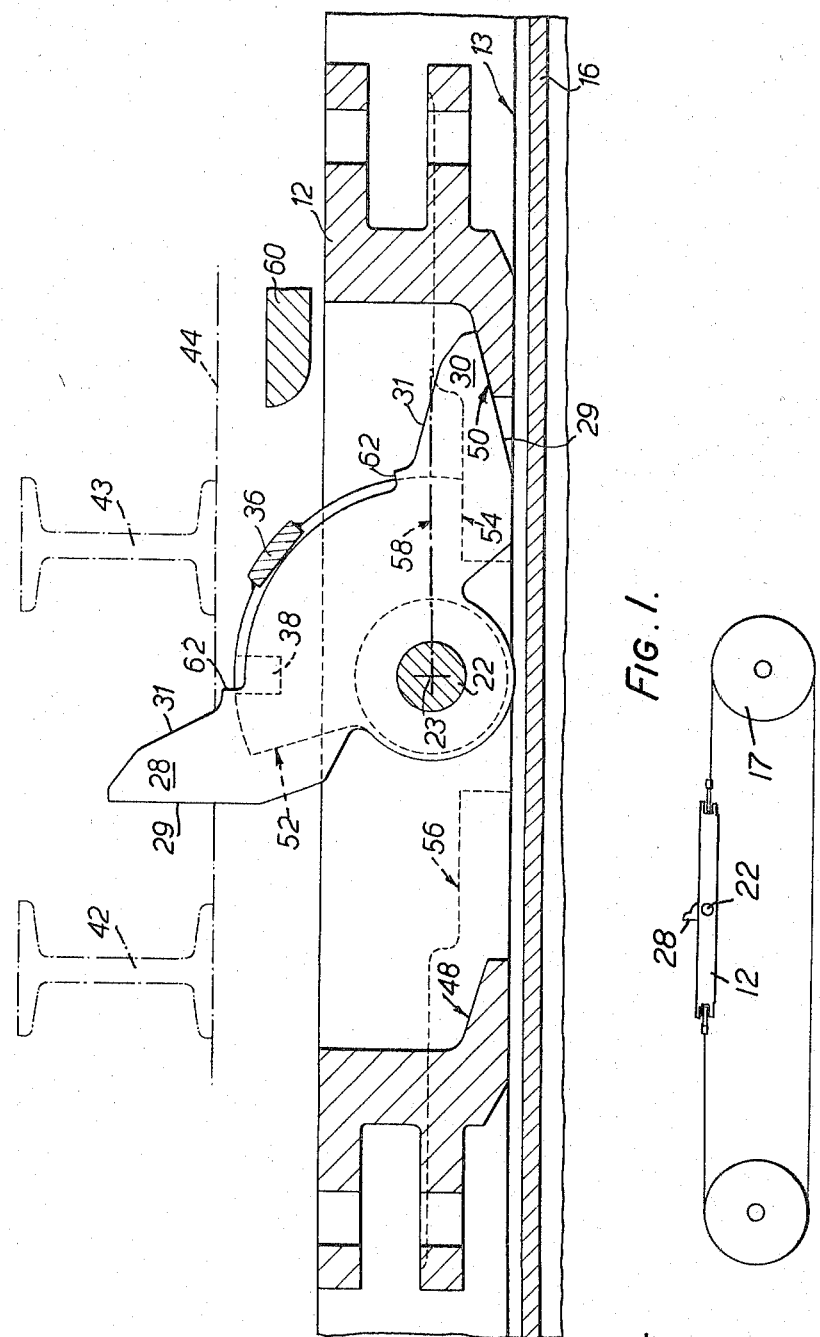

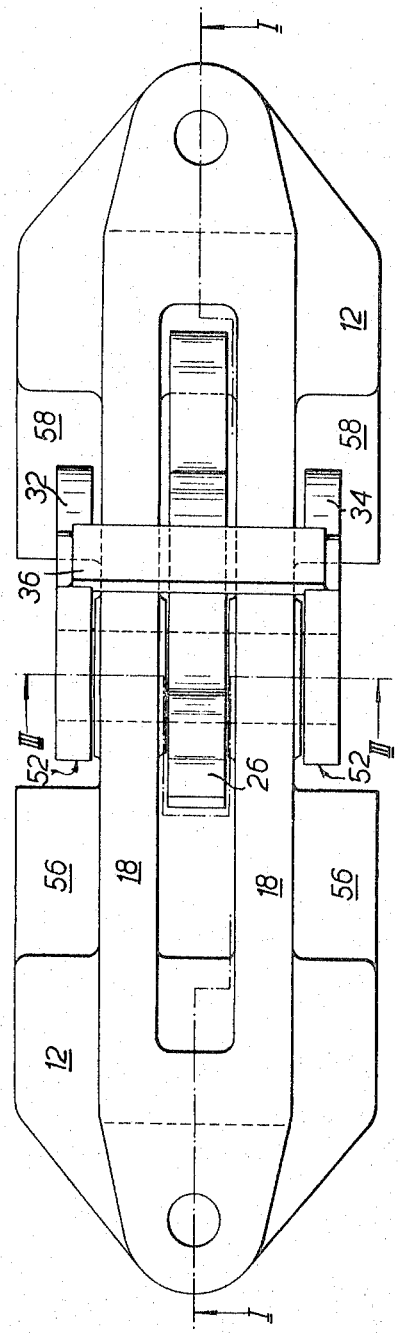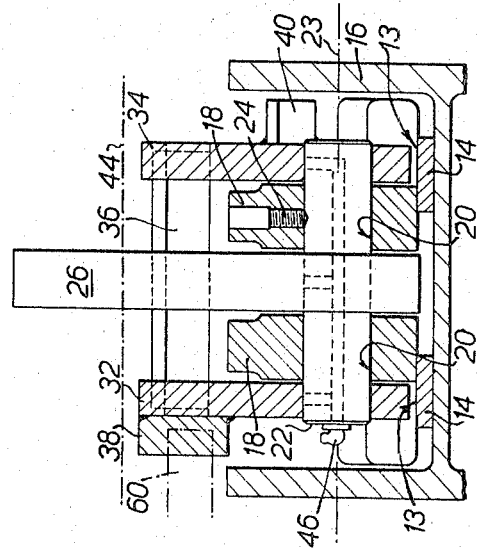

3,302,772
TRANSFER MEANS
James Francis Alsop, Sheffield, England, assignor to Davy and United Engineering Company Limited, Sheffield, England
Filed Mar. 31, 1964, Ser. No. 356,137
Claims priority, application Great Britain, Apr. 3, 1963, 13,141/63
4 Claims. (Cl. 198—221)

This invention relates to apparatus for the translation of objects along a supporting surface in either one of two opposing directions.

In one aspect the present invention provides apparatus for moving objects along a support surface in either one of first and second opposite directions, comprising a carriage arranged to be moved in either of the directions, and carrying a pivotally mounted member having two stable states relative to the carriage, in a first of which states it is adapted to contact an object on the support surface and move that object with it when the carriage is moved in the first direction and to leave an object on the support surface unmoved when the carriage is moved in the second, reversed direction, and in the second of which states it is adapted to contact an object on the support surface and move that object with it when the carriage is moved in the second direction and to leave an object on the support surface unmoved when the carriage is moved in the first direction.

In another aspect the invention provides apparatus for moving objects along a support surface in either one of first and second opposing directions, comprising a carriage, means for moving the carriage in either of the directions, a rotatable member pivotally mounted on the carriage for rotation about a horizontal axis normal to the directions of movement of the carriage, the rotatable member having two, angularly spaced, extending parts, and being rotatable between first and second stable positions relative to the carriage, in a first of which positions it is prevented from further rotation in one direction about the axis and the first of the extending parts projects substantially upwards, and in the second of which positions it is prevented from further rotation in the other direction about the axis and the second of the extending parts projects substantially upwards.

Preferably the rotatable member is urged towards its stable positions by its own weight, and a second, relatively rotatable member, is provided to increase this effect.

Preferably in either of its stable states the upwardly projecting member is adapted to contact an object on the support surface, such that movement of the carriage and member in one direction causes the object to be moved in that direction, while on reverse movement of the carriage contact of the projecting member with an object causes the member to pivot and ride under the object leaving it unmoved on the surface.

An embodiment of apparatus for the translation of objects, in accordance with the invention, will now be described, by way of example only, with reference to the accompanying drawings of which, FIGURE 1 is a section, taken on the line I—I of FIGURE 2, showing a reversible dog for translating beams along a cooling bank associated with a rolling mill for rolling beams, FIGURE 1(a) is a schematic view of the mechanism for advancing the carriage illustrated in FIGURE 1, FIGURE 2 is a plan view with the beam 16 omitted, and FIGURE 3 is a section on the line III—III of FIGURE 2.

A carriage 12 is slidably supported on surfaces 13 of wearing strips 14 carried on a beam 16, and is translatable along the beam in opposing directions, to the left or right in FIGURE 1, by any suitable means such as a winch drive 17 shown in FIGURE 1(a). Upstanding flanges 18 on the carriage are provided with bores 20 in which a shaft 22, having an axis 23 normal to the opposing directions of translation of the carriage 12, is supported, and which is located axially by a set screw (not shown) screwed into a threaded bore 24 in one of the flanges.

A rotatable member 26 in the form of a sector shaped plate having two, radially projecting, angularly spaced, extending parts 28 and 30, is pivotally mounted at the centre of the shafts 22. A second rotatable member in the form of two plates 32 and 34, arranged on either side of the member 26 and tied together by a bridge-piece 36, is also pivotally mounted on the shaft 22.

A stop 38 is welded to the plate 32 and a stop 40 is welded to the plate 34. The stops 38 and 40 are not shown in FIGURE 2.

Objects to be translated, in the form of beams 42 and 43, are carried on an associated supporting surface indicated at 44.

The bearing surfaces of the plates 26, 32 and 34 and the shaft 22, are lubricated by way of a grease nipple 46 and associated passageways.

The rotatable member 26 has two stable positions; in one of which, that illustrated in FIGURE 1, it is prevented from further rotation to the right, by means of the extending part 30 abutting a surface 50 on the carriage 12, and in the other of which, not illustrated, it is prevented from further rotation in the other direction by contact of extending parts 28 with a surface 48 on the carriage. The extending parts 28 and 30 are located on opposite sides of the centre of gravity of the member 26, and in order to move from one stable position to the other stable position the centre of gravity of the body must be raised to pass over the axis 23. In each of the stable positions, one of the extending parts 28, 30 projects substantially upwards and has one substantially vertical plain face 29 extending in a direction normal to the directions of movement of the carriage, and an opposed, inclined face 31 tapering downwardly and away from the vertical face 29. The plates 32 and 34 have two similar stable positions, in which they are prevented from pivoting further in the respective directions about axis 23 by contact of their surfaces 52 and 54 respectively with surfaces 56 and 58 on the carriage. Fixed abutments, one of which is illustrated at 60, are arranged on either side of the normal extent of travel of the carriage, to contact one of the stops 38 and 40 when it is required to move the member 26 from one stable position to its other stable position.

In operation, the carriage 12 is moved to the left in FIGURE 1 and when the surface 29 of the extending part 28 contacts the beam 42 the beam is moved to the left with the carriage. When the carriage is returned to the right and the inclined surface 31 contacts the beam 43, this contact serves to pivot the member counter-clockwise so that the extending part 28 rides under the beam without moving it. The carriage can then again be moved to the left to shift the beam 43. The member 26 is designed so that it can pivot sufficiently for the extending part to ride under a beam without its centre of gravity reaching the vertical plane above the axis 23, so that after the extending part has passed the beam the weight of the member returns it to its original stable position. The member 26 can also pivot this far without contacting the bridge member 36.

When it is desired to move objects in the other direction, to the right in FIGURE 1, the carriage is traversed to a position where the fixed abutment 60 will contact the stop 38 so that further movement of the carriage to the right causes the member 32, 34, 36 to pivot about the shaft 22 until its centre of gravity passes over the axis 23, and the member falls to its other stable position in which the surfaces 52 contact the surfaces 56 on the carriage. During this pivotal movement of the member 32, 34, 36 the bridge-piece 36 contacts an abutment 62 on the member 26 and pushes this plate until its centre of gravity also passes over the axis 23, when the member 26 will fall to its other stable position. The device is then operable to move beams from left to right in FIGURE 1. At normal speed of operation, when the inclined surface of, for example, the extending part 28 strikes a beam, sufficient kinetic energy is imparted to the member 26 to carry it over to its other stable position. However, with the arrangement shown, before the centre of gravity passes over the axis 23, the abutment 62 will contact bridge-piece 36, and the kinetic energy of member 26 is transmitted from the member to the second rotatable member 32, 34, 36 whose inertia is sufficient to absorb the kinetic energy, without the rotatable members being transferred to their other stable position. Thus neither of the rotatable members can go from one stable position to the other stable position without carrying the other of the members with it.

In an alternative arrangement the carriage 12 instead of sliding on wearing strips 14 is provided with wheels and rides on rails.

In accordance with the provisions of the patent statutes, I have explained the principle and operation of my invention and have illustrated and described what I consider to represent the best embodiment thereof. However, I desire to have it understood that within the scope of the appended claims, the invention may be practiced otherwise than as specifically illustrated and described.

I claim:
1. In combination with a support table having a horizontal support surface, apparatus for moving objects along the surface, the apparatus comprising a carriage located below the support surface and arranged to be moved in either of first and second opposite directions, a first rotatable member pivotally mounted on the carriage for rotation about a horizontal axis normal to the first and second directions, the first rotatable member having first and second angularly spaced extending parts and being rotatable about said axis between two stable positions relative to the carriage, in a first of which positions it is prevented from further rotation in one direction about said axis and the first extending part projects above the support surface, and in the second of which positions it is prevented from further rotation in the other direction about said axis and the second of the extending parts projects above the support surface, the first rotatable member having a center of gravity positioned such that in order to rotate from one stable position to the other stable position the center of gravity must pass over said axis, and the member being positioned relative to the support surface such that it can ride under the support surface without the center of gravity rising to a vertical plane through said axis, a second rotatable member pivotally mounted for rotation about said axis, and having two stable positions, in a first of which it is prevented from further rotation in one direction about said axis, and in a second of which it is prevented from further rotation in the other direction about said axis, and having a center of gravity positioned such that in order to move from one stable state to the other stable state it must pass over said axis.

2. Apparatus according to claim 1 in which the first and second rotatable members can rotate independently of one another through a predetermined angle from either stable position, but neither member can go from one stable position to the other stable position without the other member.

3. Apparatus according to claim 2 in which the first rotatable member comprises a plate, the second rotatable member comprises a pair of plates rotatably mounted on a shaft on either side of the first rotatable member, the plate forming the second rotatable member being connected by a bar, which is arranged to engage the first rotatable member after either of the rotatable members has rotated through said predetermined angle relative to the other member.

4. Apparatus according to claim 2 including fixed stops, the carriage being movable to positions in which the stops operatively contact the first rotatable member, the stops being at a level beneath that of the support surface such that the first rotatable member cannot ride under them so that movement of the carriage towards a stop after engagement of the stop and member causes the member to be moved from one stable position to the other stable position.

References Cited by the Examiner
UNITED STATES PATENTS
3,110,391    11/1963    Warren _____ 198—170
FOREIGN PATENTS
537,201    2/1922    France.

EVON C. BLUNK, *Primary Examiner.*
RICHARD E. AEGERTER, *Examiner.*